United States Patent
Loeser et al.

(10) Patent No.: US 9,487,377 B2
(45) Date of Patent: Nov. 8, 2016

(54) ELEVATOR INSTALLATION

(71) Applicant: ThyssenKrupp Transrapid GmbH, Kassel (DE)

(72) Inventors: Friedrich Loeser, Riemerling (DE); Luipold Miller, Ottobrunn (DE); Qinghua Zheng, Taufkirchen (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 676 days.

(21) Appl. No.: 13/847,531

(22) Filed: Mar. 20, 2013

(65) Prior Publication Data

US 2013/0270041 A1 Oct. 17, 2013

Related U.S. Application Data

(63) Continuation of application No. PCT/EP2011/066693, filed on Sep. 26, 2011.

(30) Foreign Application Priority Data

Oct. 7, 2010 (DE) .................. 10 2010 042 144

(51) Int. Cl.
*B66B 9/00* (2006.01)
*B66B 7/02* (2006.01)
(Continued)

(52) U.S. Cl.
CPC ........... *B66B 11/0045* (2013.01); *B66B 7/022* (2013.01); *B66B 11/0407* (2013.01); *B66B 9/00* (2013.01); *H02K 41/02* (2013.01)

(58) Field of Classification Search
CPC ... B66B 11/047; B66B 9/02; B66B 11/0407; B66B 17/12; H02K 41/02; H02K 41/025

USPC ............... 310/12.02, 21.11; 318/687
See application file for complete search history.

(56) References Cited

U.S. PATENT DOCUMENTS

| 4,402,386 A | 9/1983 | Ficheux et al. |
| 5,090,516 A | 2/1992 | Grinaski et al. |

(Continued)

FOREIGN PATENT DOCUMENTS

| DE | 3422374 A1 * | 12/1985 | ......... B66B 11/0407 |
| DE | 689 21 853 | 9/1995 | |

(Continued)

OTHER PUBLICATIONS

EPO, Machine Translaton, DE 3422374A1, Oct. 19, 2015, p. 3.*

(Continued)

*Primary Examiner* — William A Rivera
*Assistant Examiner* — Stefan Kruer
(74) *Attorney, Agent, or Firm* — Lipsitz & McAllister, LLC

(57) ABSTRACT

An elevator installation is proposed having at least one car which is vertically movable upwardly and downwardly by means of a linear motor, the linear motor having stationary primary parts and a secondary part which is fixed to the car. In order to improve the elevator installation in such a way that it can be installed in a simpler manner, the elevator installation has a multiplicity of support segments on which in each case at least one primary part is mounted, in each case a support segment in combination with the at least one primary part mounted thereon forming a prefabricated drive module which is adapted to be handled independently, and the drive modules being stackable one on top of the other and forming a travel path along which the at least one car is movable.

19 Claims, 5 Drawing Sheets

(51) Int. Cl.
*B66B 11/04* (2006.01)
*H02K 41/02* (2006.01)
*B66B 11/00* (2006.01)

(56) References Cited

U.S. PATENT DOCUMENTS

| | | | |
|---|---|---|---|
| 5,197,570 A | | 3/1993 | Matsui |
| 5,203,432 A | * | 4/1993 | Grinaski ............ B66B 11/0055 187/251 |
| 5,235,226 A | * | 8/1993 | Olsen .................. H02K 41/025 187/289 |
| 5,501,295 A | | 3/1996 | Müller et al. |
| 5,833,031 A | * | 11/1998 | Liebetrau .................. B66B 9/02 187/239 |
| 6,189,657 B1 | | 2/2001 | Jessenberger |
| 7,019,421 B1 | | 3/2006 | Hall et al. |
| 2002/0005320 A1 | * | 1/2002 | Nakagaki .................. B66B 7/02 187/408 |
| 2002/0074192 A1 | * | 6/2002 | Barker .................... B66B 7/022 187/273 |
| 2004/0262095 A1 | * | 12/2004 | Rogger ..................... B66B 7/02 187/408 |
| 2005/0077113 A1 | * | 4/2005 | Deplazes ................ B60L 13/10 187/293 |

FOREIGN PATENT DOCUMENTS

| | | | | |
|---|---|---|---|---|
| DE | WO 2012045606 A1 | * | 4/2012 | ......... B66B 11/0407 |
| EP | 0 048 847 | | 4/1982 | |
| EP | 0 509 647 | | 10/1992 | |
| EP | 0 556 595 | | 8/1993 | |
| EP | 0 858 965 | | 8/1998 | |
| EP | 1 507 329 | | 2/2005 | |
| JP | 02286585 A | * | 11/1990 | |
| JP | 543168 | | 2/1993 | |
| JP | 0578061 | | 3/1993 | |
| JP | H0570061 | | 3/1993 | |
| JP | 05304759 | | 11/1993 | |
| JP | 09175753 | | 7/1997 | |
| JP | 10029778 | | 2/1998 | |
| JP | 2004357353 | | 12/2004 | |
| ZA | CA 2342324 A1 | * | 3/2000 | ............. B66B 15/08 |

OTHER PUBLICATIONS

AIPN Machine Translation, JP 05-070061 A, Jul. 6, 2016, pp. 1-11.*
Toshiaki, Ishii, "Elevators for Skyscrapers", IEEE Spectrum, IEEE Inc. New York, vol. 31, No. 9, Sep. 1, 1994, pp. 42-46.
English language machine translation of the specification and claim for JPH0570061, 6 pages.

* cited by examiner

ELEVATOR INSTALLATION

This application is a continuation of international application number PCT/EP2011/066693 filed on Sep. 26, 2011 and claims the benefit of German application number 10 2010 042 144.8 filed on Oct. 7, 2010, which are incorporated herein by reference in their entirety and for all purposes.

BACKGROUND OF THE INVENTION

The invention relates to an elevator installation having at least one car which is vertically movable upwardly and downwardly by means of a linear motor, the linear motor having stationary primary parts and a secondary part which is fixed to the car.

Conventional elevator installations generally have a car which is vertically movable upwardly and downwardly in a shaft, and is driven by a driving pulley over which a traction cable that connects the car to a counterweight is guided. These types of elevator installations have proven successful in practice. Elevator installations are also known in which the car is hydraulically driven. However, due to technical and economic reasons, their use remains limited to relatively low lifting heights.

It has previously been proposed, in particular for elevator installations for very high buildings, to use cars which are directly driven by means of a linear motor, without a cable. In these types of elevator installations, counterweights as well as traction cables may be dispensed with. This has the advantage that the masses to be accelerated may be kept low during an empty trip, so that the car may be moved at high speed and high acceleration, thus keeping waiting times short. The linear motor has stationary primary parts fixed in the shaft, which cooperate with a secondary part fixed to the car. For example, the secondary part fixed to the car may be configured in the form of exciting magnets, and the primary parts fixed in the shaft may be provided in the form of stator windings. To achieve a high efficiency of the linear motor, an air gap between the secondary part and the primary parts should be kept as small as possible. This requires exact guiding of the car, as well as precise mounting of the primary and secondary parts of the linear motor.

Heretofore, efforts to implement a technically and economically satisfactory solution for the use of a linear motor in elevator installations have not been successful. The arrangement of a functional part of the linear motor on the shaft walls and on the car, including the necessary assemblies for power supply and control, as well as the precise guiding of the car for maintaining the smallest possible air gap between the primary and secondary parts, represents a very high demand on the manufacture and erection of the elevator installation. Difficulties also arise due to the dynamic and parasitic forces of the linear motor that prevail between the primary and secondary parts. Such demands and difficulties ultimately result in complex erection operations over the entire height of the shaft.

It is an object of the present invention to improve an elevator installation of the type mentioned at the outset in such a way that it allows simpler installation.

SUMMARY OF THE INVENTION

For an elevator installation of the type mentioned at the outset, this object is achieved according to the invention in that the elevator installation has a multiplicity of support segments on which in each case at least one primary part is mounted, in each case a support segment in combination with the at least one primary part mounted thereon forming a prefabricated drive module which is adapted to be handled independently, and the drive modules being stackable one on top of the other and forming a travel path along which the at least one car is movable.

In the elevator installation according to the invention, drive modules are used which may be prefabricated in the manufacturing plant, for example. The drive modules can be handled independently, and are stacked one on top of the other during the erection of the elevator installation. As a whole, the drive modules form a travel path for the car. Each drive module includes a support segment on which at least one primary part of the linear motor is mounted. Thus, all components and assemblies of the stationary motor part of the linear motor are integrated into prefabricated drive modules which can be handled independently. This allows the assembly, adjustment, and quality assurance measures to be transferred to a great extent to the production area of the elevator installation. At the building site, it is then necessary only to stack the individual drive modules one on top of the other in order to form the travel path for the car. All components and functional surfaces necessary for implementing the drive, guide, braking, and holding functions in cooperation with the secondary part which is fixed to the car may be integrated into the drive modules. The modularization allows efficient, high-quality production, as well as considerable simplification of the erection and start-up of the elevator installation on site. The erection of the elevator installation in a building may be adapted to the progress in the construction of the building. With increasing construction progress, more and more drive modules can be stacked one on top of the other, and by means of suitable connecting elements may be electrically and mechanically connected to one another and connected to a power supply unit of the building. The modularity of the elevator installation allows partial heights to be placed in operation in keeping with the construction progress of the building, so that the elevator installation may already be used in carrying out finishing works on the building prior to its final completion.

It is advantageous if the drive modules are adapted to be tightened against one another. The erection of the elevator installation may be additionally simplified in this way.

It may be provided, for example, that abutting drive modules are adapted to be tightened against one another by means of at least one turnbuckle. The turnbuckle may have a tensioning screw in the form of a twin screw, having a right-handed and a left-handed thread, which holds together, by tensile stress, two drive modules that have corresponding internal threads. The connection between the drive modules may be tightened or loosened by turning the tensioning screw. For this purpose, the tensioning screw formed as a twin screw may have, for example, a cross hole or a polygon, in particular a hexagon, between the right-handed and the left-handed thread. Using suitable tools which engage with the cross hole or polygon, very high tensile forces may be generated between abutting drive modules, depending on the thread size and thread pitch.

The drive modules are preferably connectable to one another in a positive-fit manner. For this purpose, a tongue and groove joint, for example, may be used. The positive-fit connection of the drive modules ensures in a simple manner that the drive modules may be precisely aligned with one another during the erection of the elevator installation without complicated adjustment operations, in order to form the travel path for the car.

It is particularly advantageous for the drive modules to have a self-supporting configuration. In such an embodiment, the drive modules are dimensioned in such a way that, in addition to the compressive load from their own weight, they also take up the loads of the primary parts of the linear motor as well as the acceleration, braking, and guide forces of the linear motor, including dynamic and parasitic forces that occur between the primary parts and the secondary part. As a whole, the self-supporting drive modules may form a support structure of the elevator installation which includes all primary parts of the linear motor. The at least one movable car can be moved along the support structure.

The drive modules are advantageously horizontally supportable on a shaft wall and/or a building structure. For example, it may be provided that the drive modules may be anchored to a shaft wall of the elevator installation, whereby the anchoring takes up practically only horizontally acting forces, whereas vertically directed forces from the drive modules stacked one on top of the other are conducted into the shaft floor.

However, the use of a shaft wall which extends from a shaft floor to a shaft ceiling of the elevator installation is not absolutely necessary. It may also be provided that the drive modules may be horizontally supported directly on a building structure. It may be provided that the building structure takes up only horizontally acting forces, whereas vertically directed forces are conducted by the drive modules into the shaft floor. However, it may also be provided that the building structure also takes up vertically directed forces. For example, the drive modules may be mounted so that they are suspended from or seated on carrying or support elements of the building structure. In particular, the drive modules may be fixed to floor slabs which support the drive modules. The suspended or seating mounting provides the option, for example, of implementing elevator installations that extend only over an upper partial region of a building.

The drive modules in each case advantageously include at least one securing device for fixing to a shaft wall and/or a building structure. The securing device may, for example, include at least one anchor by means of which the drive modules are connectable to the shaft wall and/or the building structure.

It is particularly advantageous if the drive modules are fixable to a shaft wall and/or a building structure with damping elements provided in between. The damping elements, which are situated between the drive modules and the shaft wall and/or the building structure, allow low-vibration mounting of the drive modules. The transmission of vibrations from the drive modules to the shaft wall or to the building structure may thus be kept low during operation of the elevator installation. The damping elements are preferably formed as elastically deformable spring elements.

As stated above, as a whole, the drive modules which are stacked one on top of the other form a travel path for the at least one car. It is advantageous if the drive modules have at least one guide element for guiding the at least one car in the vertical direction. The guide elements of the individual drive modules may be aligned flush with one another during their erection. Additional guide elements which must be mounted in the shaft only after the erection of the drive modules may thus be dispensed with.

It is particularly advantageous if the at least one guide element is embedded in the support segment of the drive module.

It may be provided, for example, that the drive modules have at least one guide rail along which the at least one car is movable. It is particularly advantageous if the drive modules each include a plurality of guide rails. For example, it may be provided that each drive module has at least two oppositely facing side faces on which a guide rail is situated. Guide members which are mounted on the at least one car may slide along the guide rails. The guide members may be configured as guide rollers, for example, or also in the form of sliding blocks, for example, which enclose the guide rails.

As stated above, as a whole the drive modules which are stacked one on top of the other form a support element of the elevator installation. In a particularly preferred embodiment of the invention, the support element is supported on a standing surface, for example on the shaft floor, via a vibration damping device. The vibration damping device allows vertical vibrations which occur during operation of the elevator installation to be introduced, possibly to a small extent, into the standing surface, for example the shaft floor or also a building foundation.

It may be provided that in addition to the building foundation, another isolated foundation is used which supports the vibration damping device.

The vibration damping device may have an absorber mass, for example. These types of absorber masses allow very intense damping of vibrations.

Alternatively or additionally, it may be provided that the vibration damping device has at least one spring element.

It is particularly advantageous if the support element of the elevator installation which is formed from the drive modules rests on an absorber mass which in turn is supported via at least one spring element. The combination of the absorber mass and the spring element allows particularly low-vibration mounting of the drive modules, stacked one on top of the other, on a standing surface, for example a foundation.

In a preferred embodiment of the invention, the support element formed from the drive modules stacked one on top of the other is adjustable in the vertical direction. For example, it may be provided that the support element may be raised or lowered by a lifting jack. The adjustment provides the option to compensate for shifts in the building which accommodates the elevator installation. These types of shifts may be caused, for example, by contraction, creep, or settling of the building. As a result of the support element as a whole being adjustable in the vertical direction, individual adjustments to the drive modules and in particular to the primary parts of the linear motor as well as the guide elements may be dispensed with.

The drive modules advantageously include data and/or power transmission elements. Extra data or power transmission elements, which would additionally have to be installed in the shaft after erection of the drive modules, may thus be dispensed with. The erection of the elevator installation is therefore particularly simple.

Data and power lines, for example, may be used as data and power transmission elements. The power lines may in particular be configured as cables. Optical fibers may also be provided for the data transmission. The data and/or power transmission elements may be directly fixed to the support segments of the drive modules.

It is advantageous if the drive modules have electrical and/or optical connecting elements for connecting the data and/or power transmission elements of neighboring drive modules. The connecting elements are preferably connectable to one another in a plug-in manner. The connecting elements may be configured in the shape of sockets or plugs, for example. In particular, it may be provided that the connecting elements of neighboring drive modules interact with one another in a positive-fit manner when the drive modules are placed one on top of the other. This allows the erection of the elevator installation to be further simplified.

The support segments of the drive modules are preferably made of a concrete material. This allows a self-supporting configuration of the drive modules in a constructional simple manner.

It is particularly advantageous if the secondary part of the linear motor which is fixable to the car is configured as a prefabricated secondary module that is adapted to be handled independently and which is fixable to the car. This allows assembly, adjustment, and quality assurance measures for the secondary part also to be transferred to the production area. The functional cooperation of the primary parts of the linear motor with the secondary part may then be checked in the manufacturing plant.

The following description of preferred embodiments of the invention, in conjunction with the drawings, is used to explain the invention in greater detail.

DETAILED DESCRIPTION OF THE INVENTION

Figure 1:
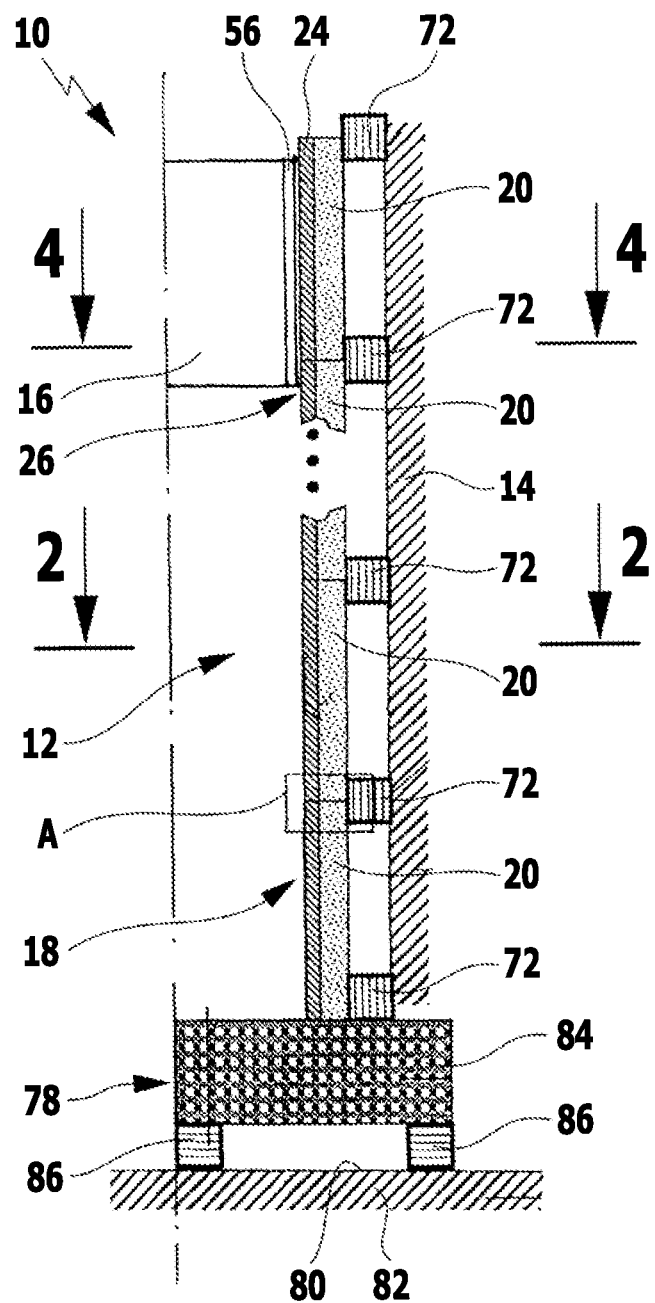
FIG. 1: shows a schematic vertical half section of a first embodiment of an elevator installation according to the invention, having a car which is vertically movable upwardly and downwardly along a support element formed from identical drive modules.
Figure 2:
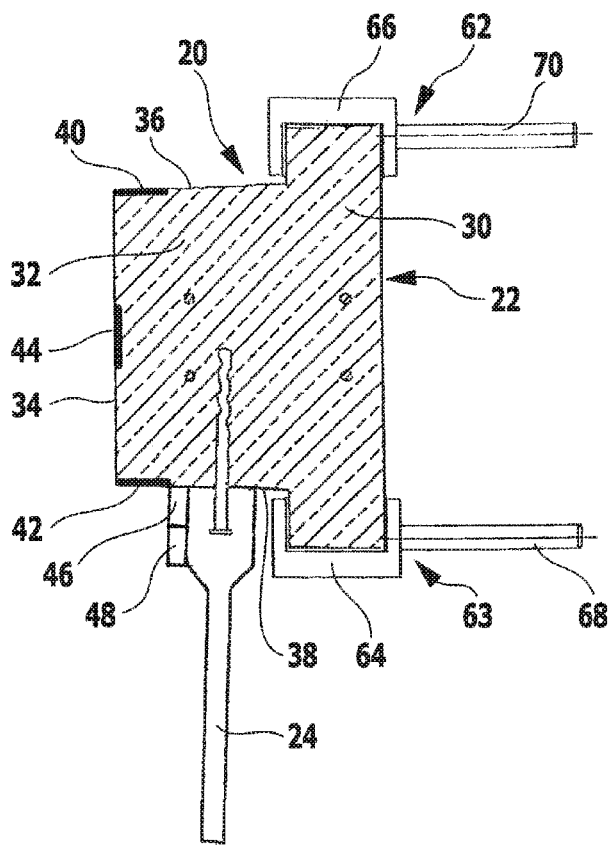
FIG. 2: shows a sectional view of a drive module along the line 2-2 in FIG. 1.
Figure 3:
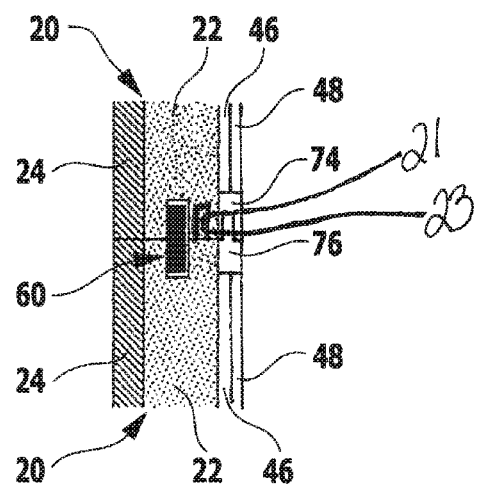
FIG. 3: shows an enlarged sectional view of detail A from FIG. 1.
Figure 4:
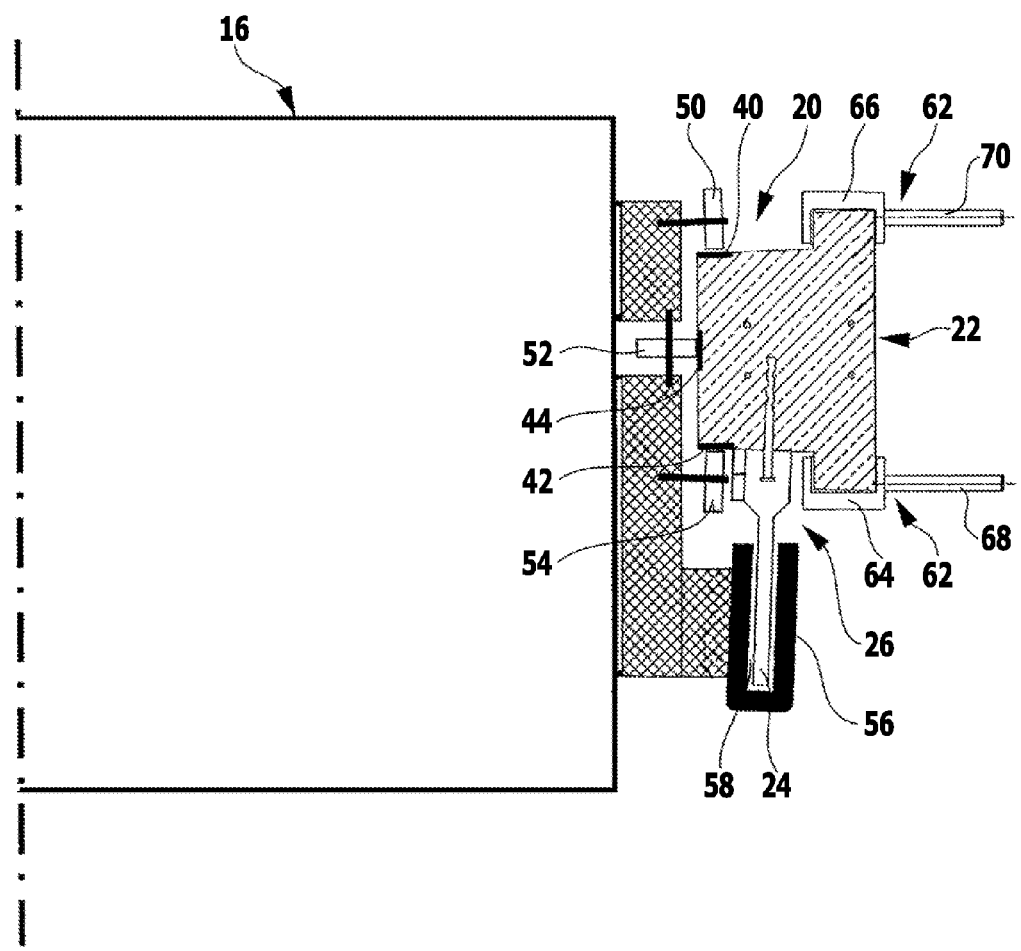
FIG. 4: shows a sectional view of the elevator installation along the line 4-4 in FIG. 1.

FIGS. 1 to 4 schematically illustrate a first embodiment of an elevator installation according to the invention, which as a whole is denoted by reference numeral 10. The elevator installation includes a shaft 12 which is delimited by shaft walls, only a single shaft wall 14 being illustrated in the drawing for the sake of better clarity.

In the illustrated embodiment, a car 16 is vertically movable upwardly and downwardly in the shaft 12. However, the invention is not limited to elevator installations in which a single car is used. It may also be provided that the elevator installation has a plurality of cars which may be situated one above the other in the shaft 12, and moved vertically upwardly and downwardly independently of one another.

The car 16 can be moved along a support element 18 which extends over the entire length of the shaft 12. The support element 18 is formed by identically configured drive modules 20 which are stacked one on top of the other, and whose configuration is apparent in particular from FIG. 2. Each drive module 20 includes a solid support segment 22 made of a concrete material and, fixed to the support segment 22, a primary part 24 of a linear motor 26, which drives the car 16.

The support segment comprises a rectangular area 30, and a trapezoidal area 32 which projects from a longitudinal side of the rectangular area 30 and protrudes into the shaft 12. The rectangular area 30 is used to fix the support segment 22 in the shaft 12, and the trapezoidal area 32 is used to guide and to drive the car 16. The trapezoidal area 32 has an end face 34 which faces away from the rectangular area 30, and a first oblique side 36 and a second oblique side 38 which join the end face 34 to the rectangular area 30. At an end region directly adjacent to the end face 34, the first oblique side 36 carries a first guide element in the form of a first guide rail 40. Similarly, in an end region directly adjacent to the end face 34, the second oblique side 38 carries a second guide element in the form of a second guide rail 42, and at the end face 34, a third guide element in the form of a third guide rail 44 is centrally mounted between the first guide rail 40 and the second guide rail 42.

The primary part 24 is fixed to the second oblique side 38 of the support segment 22 in a substantially perpendicular orientation with respect to the second oblique side 38. A data transmission element 46 and a power transmission element 48 are fixed to the second oblique side 38, between the primary part 24 and the second guide rail 42.

As mentioned above, the elevator installation 10 includes a multiplicity of drive modules 20 having an identical design and stacked one on top of the other. The drive modules as a whole form the support element 18. The car 16 slides along on the guide rails 40, 42, and 44 by means of guide members in the form of guide rollers 50, 52, 54. The car 16 has a secondary part 56 of the linear motor 26 for coupling with the primary parts 24 which are fixed to the drive modules 20. The secondary part 56 is of U-shaped configuration and engages around the primary parts 24 which are in flush alignment with one another, an air gap 58 having a small dimension being formed between the current primary part 24 and the secondary part 56. This is apparent from FIG. 4.

Drive modules 20 which abut one another are joined together by means of connecting elements (groove 21, tongue 23) which cooperate in a positive-fit manner, and are tightened against one another by means of a turnbuckle 60. The drive modules 20 each have a self-supporting configuration, so that the support element 18 formed by the entirety of the drive modules 20 takes up the weight of the drive modules 20 themselves as well as the acceleration, braking, and guide forces of the car 16. For the horizontal connection of the support element 18 to the shaft wall 14, the drive modules 20 have two securing devices 62, 63 with two identical retaining clamps 64, 66, respectively, which in each case engages around an end portion of the rectangular area 30 of the support segment 22 and are connected to the shaft wall 14 by means of tie rods 68 and 70, respectively. To reduce the transmission of vibrations of the support element 18 to the shaft wall 14, a plurality of identically-formed damping elements 72 arranged at a spacing from one another is situated between the drive modules 20 and the shaft wall 14. This is apparent from FIG. 1.

The data and power transmission elements 46, 48 of drive modules 20 which directly abut one another, are joined together by connecting elements 74, 76 which are connectable in a plug-in manner. This is apparent from FIG. 3. The connecting elements 74, 76 may be configured, for example, in the form of a connecting socket and a connecting plug which cooperates with the socket in a positive-fit manner. When the drive modules 20 are connected to one another in a positive-fit manner, in each case a connecting plug engages with a connecting socket of complementary form.

The support element 18 is supported on a standing surface 80 via a vibration damping device 78. The standing surface 80 forms the floor of the shaft 12 and is part of a foundation 82 which receives the vertical forces acting on the support element 20. This may involve the foundation of the building in which the elevator installation 10 is installed; however, a separate foundation which is isolated from the building foundation may also be provided.

The vibration damping device 78 includes an absorber mass 84 on which the support element 18 rests, and which is supported on the standing surface 80 via spring elements 86.

For installing the elevator installation 10, the prefabricated drive modules 20, which can be handled independently, can be stacked one on top of the other and tightened against one another to form the support element 18, which forms a travel path for the car 16 along which the car 16 is movable. The secondary part 56 of the linear motor 26 is also formed as a prefabricated module which can be handled independently, and may be fixed to the car 16 during the erection of the elevator installation 10. As the result of integrating the primary parts 24 of the linear motor 26 as well as the guide rails 40, 42, and 44 into the drive modules 20, complicated adjustments during erection of the elevator installation 10 in the shaft 12 as well as subsequent readjustments are unnecessary, since no safety-relevant screw connections, which have a tendency to loosen and detach when dynamic loads are introduced, are used. The guide rails 40, 42, and 44 are embedded in the solid support segments 22. Alternatively, it may be provided that for the guide rails 40, 42, and 44, corresponding guide surfaces of the support segments 22 are directly used for guiding the car 16. Misalignments in butting together between neighboring drive modules are avoided as the result of a precisely fitting connection of the drive modules. If slight misalignments in butting together should nonetheless occur between neighboring drive modules 20 during the erection of the elevator installation 10, these may be ground off during erection.

Figure 5:
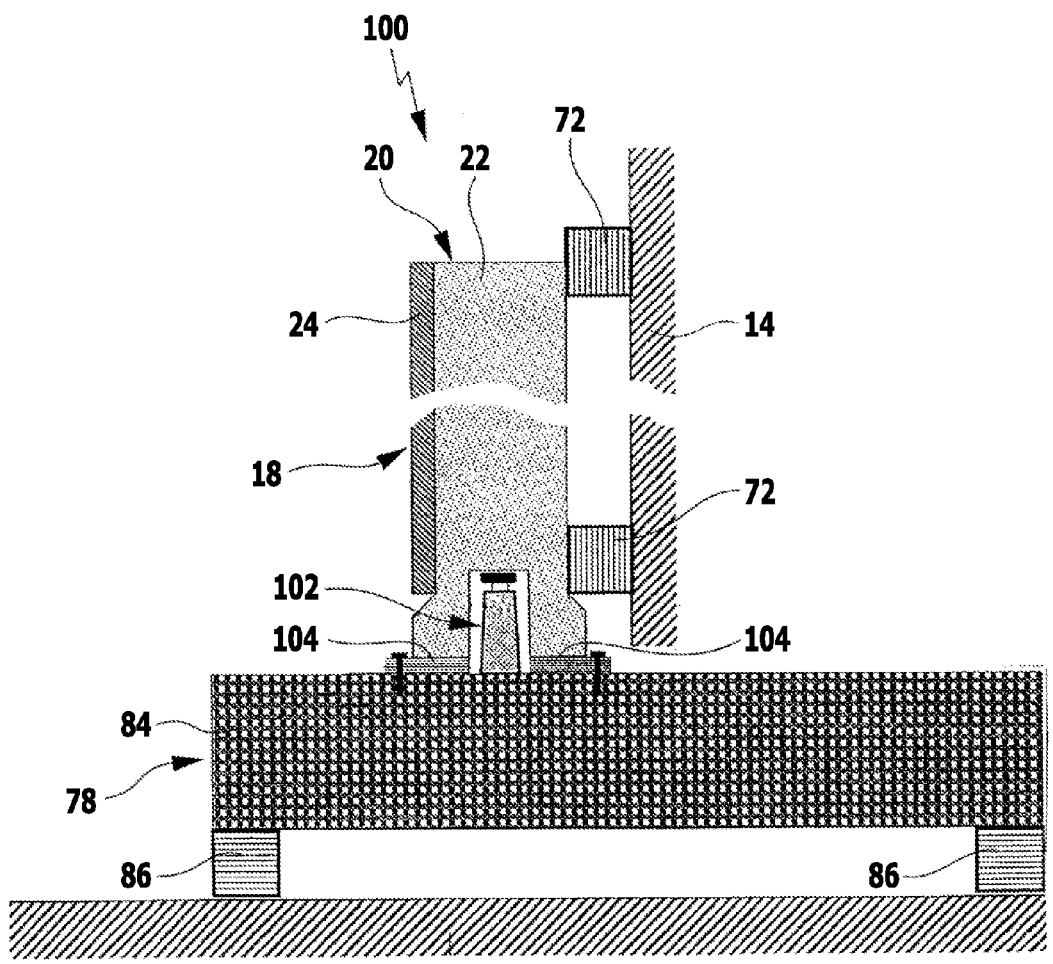
FIG. 5: shows a schematic half section of a second embodiment of an elevator installation according to the invention in the region of a shaft floor.

FIG. 5 schematically illustrates a second embodiment of an elevator installation according to the invention, and which as a whole is denoted by reference numeral 100. The elevator installation is for the most part identical to the elevator installation 10 described above with reference to FIGS. 1 to 4. Therefore, in FIG. 5 as well as FIGS. 6 and 7 explained below, the same reference numerals are used as in FIGS. 1 to 4 for identical components. With regard to these reference numerals, reference is made to the discussions above to avoid repetitions.

The elevator installation 100 illustrated in FIG. 5 differs from the elevator installation 10 illustrated in FIGS. 1 to 4 solely in that the support element 18 formed by the drive modules 20 may be adjusted in the vertical direction. For this purpose, a lifting jack 102 which is schematically illustrated in FIG. 5 is used, by means of which the support element 18 may be raised and lowered. The support element 18 may be supported in a desired position by means of filling plates 104, so that after the support element 18 is adjusted, the lifting jack 102 may be released.

The option of displacing the support element 18 in the vertical direction by means of the lifting jack 102 is advantageous in particular with regard to settling of the building in which the elevator installation 100 is installed. If this type of settling occurs, the support element 18 may be appropriately readjusted without the individual drive modules 20 having to be separately adjusted. Adjustments which are necessary due to building settling may thus be minimized.

Figure 6:
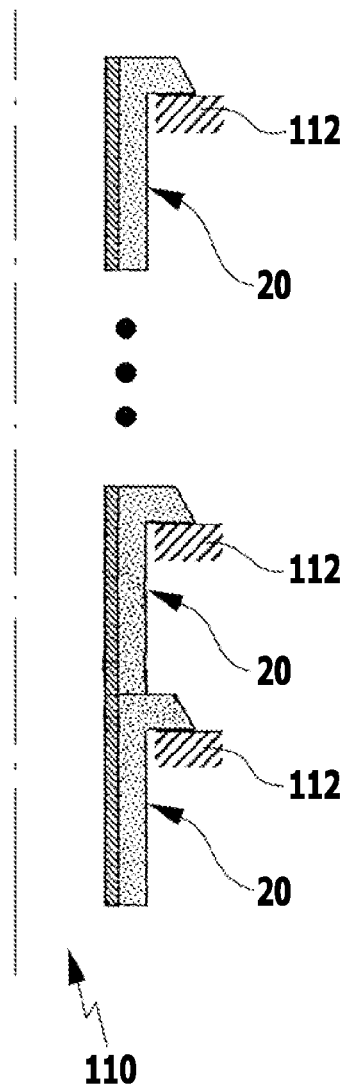
FIG. 6: shows a schematic half section of a third embodiment of an elevator installation according to the invention.

FIG. 6 illustrates a third embodiment of an elevator installation according to the invention, which as a whole is denoted by reference numeral 110. The elevator installation 110 differs from the above-described elevator installations 10 and 100 in that the drive modules 20 of the support element 18 are each supported in the vertical direction on a building structure, namely, on a building roof or floor slab 112, which carries a drive module 20. This type of configuration is particularly advantageous when the elevator installation 110 is to extend only over an upper region of a building. The support on a building structure also provides the option of dispensing with shaft walls.

Figure 7:
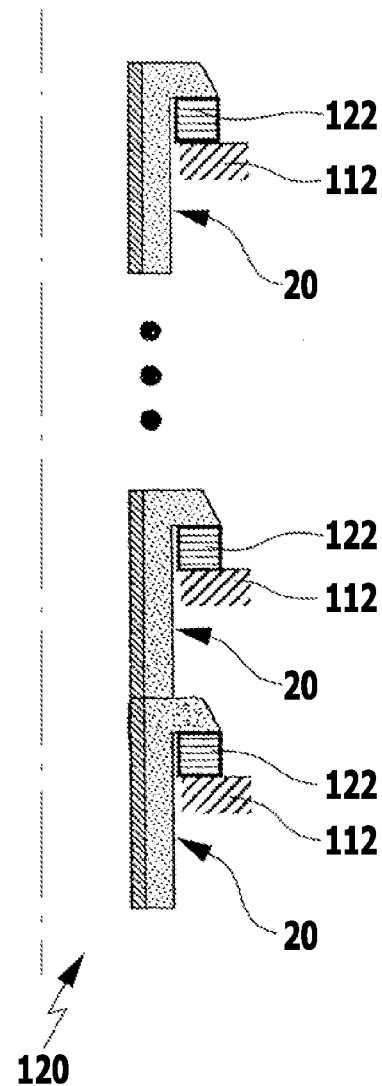
FIG. 7: shows a schematic half section of a fourth embodiment of an elevator installation according to the invention.

FIG. 7 illustrates a fourth embodiment of an elevator installation according to the invention, which as a whole is denoted by reference numeral 120. The elevator installation differs from the elevator installation 110 illustrated in FIG. 6 solely in that a damping element 122 is situated between the drive modules 20 and the particular building roof or floor slab 112 on which the drive modules 20 are mounted. The transmission of vibrations from the drive modules 20 to the building roof or floor slabs may be minimized by providing the damping elements 122.

The invention claimed is:

1. An elevator installation, comprising:
   at least one car which is vertically movable upwardly and downwardly by means of a linear motor,
   the linear motor comprising stationary primary parts and a secondary part which secondary part is fixed to the at least one car,
   a multiplicity of support segments, at least one of the primary parts being mounted on a corresponding one of each of the multiplicity of support segments,
   separate drive modules, each of which is formed by one of the support segments of the multiplicity of support segments in combination with the at least one primary part mounted thereon, and
   the separate drive modules being stackable one on top of another and forming a travel path along which the at least one car is movable,
   wherein each of the support segments is made of a concrete material.

2. The elevator installation according to claim 1, wherein the separate drive modules are adapted to be tightened against one another.

3. The elevator installation according to claim 2, wherein abutting pairs of the separate drive modules are adapted to be tightened against one another by means of at least one turnbuckle.

4. The elevator installation according to claim 1, wherein the separate drive modules comprise at least one guide element for guiding the at least one car in a vertical direction.

5. The elevator installation according to claim 4, wherein the at least one guide element is embedded in each of the support segments.

6. The elevator installation according to claim 4, wherein each of the at least one guide elements is configured as a guide rail along which the at least one car is movable.

7. The elevator installation according to claim 1, wherein the separate drive modules are stacked one on top of the other to form a support element which rests on a standing surface via a vibration damping device.

8. The elevator installation according to claim 7, wherein the vibration damping device comprises a vibration absorbing mass.

9. The elevator installation according to claim 7, wherein the vibration damping device comprises at least one spring element.

10. The elevator installation according to claim 1, wherein the separate drive modules are connectable to one another in a positive-fit manner.

11. The elevator installation according to claim 1, wherein the separate drive modules have a self-supporting configuration.

12. The elevator installation according to claim 1, wherein the separate drive modules are horizontally supportable on at least one of a shaft wall and a building structure.

13. The elevator installation according to claim 1, wherein each of the separate drive modules comprises at least one securing device for fixing each of the separate drive modules to at least one of a shaft wall and a building structure.

14. The elevator installation according to claim 1, wherein the separate drive modules are fixable to at least one of a shaft wall and a building structure with damping elements provided in between the separate drive modules and the at least one of the shaft wall and the building structure.

15. The elevator installation according to claim 1, wherein the separate drive modules are stacked one on top of another to form a support element which is adjustable in a vertical direction of the elevator installation.

16. The elevator installation according to claim 1, wherein the separate drive modules comprise at least one of data transmission elements and power transmission elements.

17. The elevator installation according to claim 1, wherein the separate drive modules comprise data transmission elements and at least one of electrical and optical connecting elements for connecting the data transmission elements of the separate drive modules that abut against one another.

18. The elevator installation according to claim 1, wherein the separate drive modules comprise power transmission elements and at least one of electrical and optical connecting elements for connecting the power transmission elements of the separate drive modules that abut against one another.

19. The elevator installation according to claim 1, wherein the secondary part of the linear motor is configured as a separate secondary module which is fixed to the at least one car.

* * * * *